(12) United States Patent
Schäfer et al.

(10) Patent No.: US 10,893,669 B2
(45) Date of Patent: Jan. 19, 2021

(54) DETERMINATION OF THE REQUIREMENTS ON PLANT PROTECTION AGENTS

(71) Applicant: BASF Agro Trademarks GmbH, Ludwighafen am Rhein (DE)

(72) Inventors: Fabian Johannes Schäfer, Solingen (DE); Holger Hoffmann, Haan (DE); Ole Peters, Düsseldorf (DE); Gang Zhao, Düsseldorf (DE)

(73) Assignee: BASF Agro Trademarks GmbH, Ludwighafen am Rhein (DE)

( * ) Notice: Subject to any disclaimer, the term of this patent is extended or adjusted under 35 U.S.C. 154(b) by 14 days.

(21) Appl. No.: 16/332,842

(22) PCT Filed: Sep. 11, 2017

(86) PCT No.: PCT/EP2017/072691
§ 371 (c)(1),
(2) Date: Mar. 13, 2019

(87) PCT Pub. No.: WO2018/050580
PCT Pub. Date: Mar. 22, 2018

(65) Prior Publication Data
US 2019/0208762 A1   Jul. 11, 2019

(30) Foreign Application Priority Data

Sep. 16, 2016   (EP) ..................... 16189253

(51) Int. Cl.
*G06K 9/00*   (2006.01)
*A01M 7/00*   (2006.01)
*A01B 79/00*   (2006.01)

(52) U.S. Cl.
CPC ......... *A01M 7/0089* (2013.01); *A01B 79/005* (2013.01)

(58) Field of Classification Search
None
See application file for complete search history.

(56) References Cited

U.S. PATENT DOCUMENTS

| | | |
|---|---|---|
| 5,915,313 A | 6/1999 | Bender et al. |
| 6,199,000 B1 | 3/2001 | Keller et al. |
| 2004/0034450 A1 | 2/2004 | Seal et al. |
| 2006/0282228 A1 | 12/2006 | Avey et al. |
| 2009/0132132 A1 | 5/2009 | Peterson et al. |
| 2012/0109614 A1 | 5/2012 | Lindores |
| 2016/0171680 A1 | 6/2016 | Lobell |

(Continued)

FOREIGN PATENT DOCUMENTS

| | | |
|---|---|---|
| WO | WO-0023937 A1 | 4/2000 |
| WO | WO-2015193822 A1 | 12/2015 |
| WO | WO-2016090212 A1 | 6/2016 |

OTHER PUBLICATIONS

U.S. Appl. No. 16/332,833, filed Mar. 13, 2019.

(Continued)

*Primary Examiner* — Atiba O Fitzpatrick
(74) *Attorney, Agent, or Firm* — Lowenstein Sandler LLP (57) ABSTRACT

The present invention relates to the cultivation of crop plants using plant protection agents. Objects of the present invention are methods, a system and a computer program product for determining the partial-area-specific requirement of a crop plant for plant protection agents.

11 Claims, 2 Drawing Sheets

(56) References Cited

U.S. PATENT DOCUMENTS

2018/0295771 A1  10/2018  Peters

OTHER PUBLICATIONS

U.S. Appl. No. 16/307,967, filed Dec. 7, 2018.
U.S. Appl. No. 16/311,191, filed Dec. 19, 2018.
U.S. Appl. No. 16/327,065, filed Feb. 21, 2019.
"Applikationskarten teilflachenspezifisch and bedarfsgerecht", Geo-Konzept, AGROSAT, 2017, pp. 1-4.
Anatoly A. Gitelson, "Wide Dynamic Range Vegetation Index for Remote Quantification of Biophysical Characteristics of Vegetation", Journal of Plant Physiology, vol. 161, Issue 2, 2004, pp. 165-173.
Bannari, et al., "A review of vegetation indices", Remote Sensing Reviews, vol. 13, Issue 1-2, 1995, pp. 95-120.
Dr. Heike Bach, "Big Data für die Landwirtschaft: TalkingFields", Landinfo 2: Informationen für die Landwirtschaftsverwaltung , Landwirtschaftlicher Hochschultag , 2014, pp. 15-16.
Hoffmann, et al., "Impact of Spatial Soil and Climate Input Data Aggregation on Regional Yield Simulations", PLoS One, vol. 11, Issue 4, Apr. 2016, pp. 1-23.
Johnen, et al., "The proPlant Decision Support System: Phenological Models for the Major Pests of Oilseed Rape and Their Key Parasitoids in Europe", Biocontrol-Based Integrated Management of Oilseed Rape Pests, 2010, pp. 381-403.
Moran, et al., "Opportunities and limitations for image-based remote sensing in precision crop management", Remote Sensing of Environment, vol. 61, Issue 3, Sep. 1997, pp. 319-346.
Newe, et al., "proPlant expert.com—an online consultation system on crop protection in cereals, rape, potatoes and sugarbeet", Bulletin OEPP EPPO Bulletin, vol. 33, Issue 3, Dec. 2003, pp. 443-449.
Viña, et al., "Comparison of different vegetation indices for the remote assessment of green leaf area index of crops", Remote Sensing of Environment, vol. 115, Issue 12, Dec. 15, 2011, pp. 3468-3478.
International Search Report for PCT/EP2017/072691 dated Dec. 1, 2017.
Written Opinion of the International Searching Authority for PCT/EP2017/072691 dated Dec. 1, 2017.

Figure 1

Figure 2

DETERMINATION OF THE REQUIREMENTS ON PLANT PROTECTION AGENTS

CROSS-REFERENCE TO RELATED APPLICATIONS

This application is a national stage application (under 35 U.S.C. § 371) of PCT/EP2017/072691, filed Sep. 11, 2017, which claims benefit of European Application No. 16189253.4, filed Sep. 16, 2016, both of which are incorporated herein by reference in their entirety.

FIELD OF THE INVENTION

The present invention relates to the cultivation of crop plants using plant protection agents. The subject matter of the present invention is a method, a system and a computer program product for determining the partial-area-specific requirement of a crop plant for plant protection agents.

BACKGROUND OF THE INVENTION

Plant protection agents are used throughout the world for protecting plants or plant products from harmful organisms or preventing the action thereof, destroying unwanted plants or plant parts, inhibiting the unwanted growth of plants or preventing such growth, and/or in another manner as nutrients for affecting the physiological processes of plants (e.g. growth regulators).

Plant protection agents may be subject to restrictions on use in some countries; for example, some plant protection agents can be used only at specified times, at specified locations, for a specified purpose and/or in a specified amount.

An additional problem in plant protection is the risk of resistance formation by insects, weeds, and fungi to individual active compounds.

Accordingly, plant protection agents should be used only when required and only in the respective amounts necessary. However, it is difficult to determine the respective requirement for plant protection agents.

The exact dosage of a plant protection agent depends on the biophysical state of the vegetation at the exact time of use of the plant protection agent. In principle, therefore, it would be necessary to determine the requirement immediately before applying a plant protection agent.

In addition, the biophysical state of vegetation is not uniform within a field. Different growth stages can be present that required an adjusted dosage.

Satellite images can provide information on the biophysical state of a field; using such images, moreover, inhomogeneities in a field can be recognized (cf. for example M. S. Moran et al.: Opportunities and Limitations for Image-Based Remote Sensing in Precision Crop Management, Remote Sensing of Environment (1997) 61: 319-346).

However, daily updated information on satellite images is ordinarily not available; on the one hand, satellite images are not taken daily in many areas, and on the other, clouds can for example make the production of usable remote sensing data difficult or even impossible.

Plant growth models provide the possibility of calculating the biophysical state of vegetation at future times. For example, WO 2016/090212 discloses a method for cultivating plants in which the historical data for a field (e.g. weather data) are first used in order to prepare an initial management plan for the field. The management plan is based on a plant growth model and indicates when the crop plants should be planted, when measures such as fertilization or watering should be carried out, and when the harvest should take place. In a second step, crop plants are cultivated according to the initial management plan. In a third step, the initial management plans are updated based on past and predicted weather data, and the initial management plan is replaced with the updated management plan.

US 2016/0171680A1 discloses a method for estimating crop yields. Satellite images of a field are used in order to correlate features in the satellite images with plant properties and thus to produce a statistical model. For example, it is proposed to correlate the weighted difference vegetation index (WDVI) with the leaf area index (LAI). The statistical model is preferably based on a multivariable linear regression. Environmental conditions are included in the model. For example, it is proposed to produce multiple statistical models in order to cover a broad range of environmental conditions (soil, climate). Based on the model, predictions can then be made, e.g. harvest yields can be estimated.

However, the drawback of such plant protection models is that they do not take into account local inhomogeneities within a field.

This gives rise to the technical object of providing a method and a system for determining the current, partial-area-specific requirement of a crop plant for plant protection agents.

BRIEF SUMMARY OF THE INVENTION

According to the invention, this object is achieved by means of the subject matter of independent claims 1, 2, 9 and 11. Preferred embodiments are found in the dependent claims and in the present description.

A first subject matter of the present invention is thus a method for determining the amount required by crop plants in a field of one or a plurality of plant protection agents, comprising the following steps:

(A) detecting inhomogeneities in the field, wherein the inhomogeneities indicate different existing and/or future growth stages of the crop plants in the field, (B) segmenting the field into partial areas based on the inhomogeneities detected in step (A), (C) provision of a plant growth model for the crop plants cultivated in the field, (D) using the plant growth model on each partial area, wherein the temporal growth behavior of the crop plant is simulated for each partial area, (E) determining a requirement of at least a portion of the crop plants cultivated in the field for treatment with one or a plurality of plant protection agents, and (F) calculating the partial-area-specific required amount of one or a plurality of plant protection agents based on the simulation of growth behavior in step (D) and the requirement determined in step (E).

A further subject matter of the present invention is a method for treating crop plants in a field with one or a plurality of plant protection agents, comprising the following steps:

(A) detecting inhomogeneities in the field, wherein the inhomogeneities indicate different existing and/or future growth stages of the crop plants in the field, (B) segmenting the field into partial areas based on the inhomogeneities detected in step (A), (C) provision of a plant growth model for the crop plants cultivated in the field, (D) using the plant growth model on each partial area, wherein the temporal growth behavior of the crop plant is simulated for each partial area,
(E) determining a requirement of at least a portion of the crop plants cultivated in the field for treatment with one or a plurality of plant protection agents,
(F) calculating the partial-area-specific required amount of one or a plurality of plant protection agents based on the simulation of growth behavior of step (D) and based on the requirement determined in step (E),
(G) preparing a partial-area-specific application map, wherein the application map is a digital representation of the field that indicates for individual partial areas of the field the respective amount(s) of (the) plant protection agent(s) to be applied, and
(H) applying one or a plurality of plant protection agents using the partial-area-specific application map.

A further subject matter of the present invention is a system comprising
(a) a digital representation of a field in which crop plants are cultivated, wherein inhomogeneities are recorded in the digital representation, wherein the inhomogeneities provide information on different existing and/or future growth stages of the crop plants in the field,
(b) means for segmenting the digital representation into partial areas based on the inhomogeneities,
(c) a plant growth model for the crop plants cultivated in the field,
(d) means for using the plant model on each partial area,
(e) means for receiving a requirement of at least a portion of the cultivated crop plants for treatment with one or a plurality of plant protection agents,
(f) means for calculating the required amount of one or a plurality of plant protection agents for each partial area based on the simulations of the growth behavior, and
(g) means for producing a partial-area-specific application map, wherein the application map is a digital representation of the field that indicates for individual partial areas of the field the respective amount(s) of (the) plant protection agent(s) to be applied.

A further subject matter of the present invention is a computer program product comprising a data carrier on which a computer program is stored, which can be loaded into the working memory of a computer and causes the computer to carry out the following steps:
(i) reading a digital representation of a field in which crop plants are cultivated into the working memory of the computer, wherein the field in the digital representation is subdivided into partial areas, wherein at least a portion of the partial areas differ with respect to existing and/or future growth behavior of the cultivated crop plants,
(ii) calculating the growth behavior of the crop plants cultivated in the field over time for each individual partial area by means of a plant growth model,
(iii) receiving a requirement of at least a portion of the cultivated crop plants for treatment with one or a plurality of plant protection agents,
(iv) calculating the required amount of the one or plurality of plant protection agent(s) for each partial area based on the calculated growth stage for the respective partial area of the crop plants cultivated there, and
(v) outputting the plant protection agent requirement for each partial area to a user.

The invention is described in further detail below without distinguishing among the subject matter of the invention (method, system, computer program product). Rather, the following explanations apply analogously to all subject matter of the invention regardless of the context in which they occur (method, system, computer program product).

When the "method according to the invention" is mentioned below, this is to be understood as referring both to the method for treating crop plants with one or a plurality of plant protection agents and to the method for determining the amount required by crop plants of one or a plurality of plant protection agents.

DETAILED DESCRIPTION OF THE INVENTION

The core of the present invention lies in determining a partial-area-specific amount of one or a plurality of plant protection agents required by crop plants that are or are to be cultivated in a field.

The term "crop plant" is understood to refer to a plant that is cultivated by human intervention in a targeted manner as a useful or ornamental plant.

The term "field" is understood to refer to a spatially delimitable area of the Earth's surface that is agriculturally used in that crop plants are cultivated, provided with nutrients and harvested in such a field.

The term "plant protection agents" is understood to refer to an agent that is used for protecting plants or plant products from harmful organisms or preventing the action thereof, destroying unwanted plants or plant parts, inhibiting the unwanted growth of plants or preventing such growth, and/or in another manner as nutrients for affecting the physiological processes of plants (e.g. growth regulators).

Examples of plant protection agents are herbicides, fungicides and pesticides (such as insecticides).

Growth regulators are used for example for increasing the stability of grain by shortening the stem length (stem shorteners, or more precisely internode shorteners), improving the rooting of cuttings, reducing plant height by compression in horticulture or preventing the germination of potatoes. They are ordinarily phytohormones or synthetic analogs thereof.

A plant protection agent ordinarily contains an active compound or a plurality of active compounds. The term "active compounds" refers to substances that have a specific action and induce a specific reaction in an organism. Ordinarily, a plant protection agent contains a carrier substance for diluting the one or plurality of active compounds. In addition, additives such as preservatives, buffers, dyes and the like are conceivable. A plant protection agent can be in solid, liquid or gaseous form.

In a first step of the method according to the invention, inhomogeneities in the field in which the crop plants are cultivated are identified.

The inhomogeneities provide information on differences in the field in which the crop plants are cultivated. The inhomogeneities detected can be an expression of existing differences in the growth behavior of the crop plants; however, it is also conceivable that the inhomogeneities detected will lead to different growth stages. Mixed forms are also conceivable.

The term inhomogeneity preferably refers to existing differences in the growth stages of individual plants within the field. Such differences occur in every field, as the local environment is different at different points in a field. For example, plants in the edge area of a field are often exposed to more wind that plants within the field. There are also variations in the soil or differences with respect to sunlight exposure of plants on a slope and on level ground.

Accordingly, what is important in determining inhomogeneities is to obtain a picture of the different growth stages of the cultivated plant that are present or expected respectively in order to allow these differences to be taken into account and to determine the respective required amount of plant protection agents for the different growth stages.

Here, the term "growth stage" is to be understood in the broad sense. The term growth stage can refer to the development stage of individual plants; but it can also refer to the amount of biomass and/or the size of the leaf area and/or the amount of fruits and/or the number of shoots present that a plant has formed at a defined point in time. On the one hand, there are crop plants that are not susceptible to a harmful organism until they have reached specified development stages. This means that treatment of the plant with a plant protection agent may not be effective until the plant has reached the corresponding development stage. On the other hand, it is conceivable that a plant with more biomass and/or a larger leaf area will require a larger amount of plant protection agents than a plant with less biomass and/or a smaller leaf area. According to the invention, the required amount of plant protection agents is to be adapted to the development stage of the crop plants and/or the amount of biomass present and/or an the size of the leaf area present and/or the amount of fruits present, etc.

It is therefore characteristic of a growth stage of a crop plant that a specified type of plant protection agent, a specified amount of plant protection agent, a specified concentration and/or a specified dosing schedule should be used in order to achieve an optimum effect, while another optimum parameter is to be selected for another growth stage.

A possibility for determining inhomogeneities lies in the use of remote sensing data.

"Remote sensing data" are digital data obtained remotely, for example by satellites, from the Earth's surface. The use of aircraft (unmanned (drones) or manned) to record remote sensing data is also conceivable.

By means of corresponding remote sensors, digital images of areas of the Earth's surface are produced from which information on the vegetation and/or the environmental conditions prevailing in said areas can be obtained (cf. for example M. S. Moran et al.: Opportunities and Limitations for Image-Based Remote Sensing in Precision Crop Management, Remote Sensing of Environment (1997) 61: 319-346).

The data from these sensors are obtained via interfaces provided by the vendor and can comprise optical and electromagnetic (e.g. synthetic aperture radar, SAR) data sets of various processing stages.

In a preferred embodiment, inhomogeneities in the field under observation are detected from remote sensing data.

A possibility lies for example in calculating a vegetation index from the remote sensing data. A known vegetation index is for example the normalized difference vegetation index (NDVI, also known as the normalized density vegetation index). The NDVI is calculated from the reflectance values in the near infrared region and the red visible region of the light spectrum. The index is based on the fact that healthy vegetation reflects a relatively small amount of radiation in the red region of the visible spectrum (wavelength of approximately 600 to 700 nm) and a relatively large amount of radiation in the adjacent near infrared region (wavelength of approximately 700 to 1300 nm). These differences in reflectance behavior are attributable to different development states of the vegetation. Accordingly, the further the growth of a cultivated crop plant has progressed, the higher the index is.

An NDVI can be calculated for each pixel of a digital image of a field (for example a satellite image of the field).

As a further possible vegetation index, the weighted difference vegetation index (WDVI) can also be determined from the remote sensing data, as proposed in US 2016/0171680 A1, with which the leaf area index (LAI) can be correlated.

A leaf area index can be calculated for each pixel of a digital image of a field (for example a satellite image of the field).

Instead of or as a complement to remote sensing data, information on existing and/or expected inhomogeneities can also be obtained by means of sensors in the field. For example, the use of a so-called N sensor, which can also be used to determine an NDVI, is also conceivable.

A parameter that indicates the inhomogeneities with respect to an existing and/or future growth stage of the cultivated crop plant in a digital representation of the field is also referred to in the following as a growth parameter. An example of such a growth parameter is an NDVI or LAI. However, a growth parameter can also be the amount of nutrients in the soil, the availability of water or the soil temperature. All parameters that have an effect on the growth and/or development of a plant can be used as growth parameters.

Possible growth parameters are described in the following publications: M. D. Steven and J. A. Clark (1990): Applications of Remote Sensing in Agriculture. University Press, Cambridge/UK, http://www.sciencedirect.com/science/book/9780408047678; A. Bannari, D. Morin, F. Bonn and A. R. Huete (2009): A review of vegetation indices. In: Remote Sensing Reviews, Vol. 13, Issue 1-2, pp. 95-120, http://www.tandfonline.com/doi/abs/10.1080/02757259509532298; A. A. Gitelson (2004): Wide dynamic range vegetation index for remote sensing quantification of biophysical characteristics of vegetation. In: Journal of Plant Physiology, Vol. 161, Issue 2, pp. 165-173, A. Viña, A. A. Gitelson, A. L. Nguy-Robertson and Y. Peng (2011): Comparison of different vegetation indices for the remote assessment of green leaf area index of crops. In: Remote Sensing of Environment, Vol. 115, pp. 3468-3478, https://msu.edu/~vina/2011_RSE_GLAI.pdf.

In a further step (step (B) of the method according to the invention), segmentation of the field is carried out. This means that a virtual representation of the field is subdivided into partial areas (segments). There is thus no physical intervention in the actual field. Even when the term "segmentation of the field" is used herein for simplification purposes, this is always to be understood as referring to segmentation of a virtual representation of the field into partial areas. The virtual representation of the field constitutes data that can be processed by a computer and can be represented using a computer in such a way that a user of the computer will recognize in the representation the corresponding real field.

Segmentation is ordinarily carried out based on one or a plurality of growth parameters. There are various possibilities for segmentation.

For example, it is conceivable to carry out segmentation based on the spatial resolution of the method for determining the inhomogeneities. This will be explained using an example. Let us assume that there is a digital satellite image of a field for which a growth parameter (e.g. a leaf area index (LAI)) can be determined for each pixel of the digital image of the field. The satellite image has a specified spatial resolution; for example, 1 pixel of the satellite image corresponds to an area of $10 \cdot 10$ m$^2$ of the imaged field. It is conceivable that a partial area can be assigned to each individual pixel. A partial area thus corresponds to an area of $10 \cdot 10$ m$^2$ on the field.

In an embodiment of the present invention, a digital representation of a field is subdivided into individual partial areas, wherein each individual pixel of the digital representation represents an individual partial area.

With increasingly high spatial resolution of the digital representation of the field, the differences between adjacent pixels, e.g. with respect to the leaf area index, become smaller and smaller. It is conceivable that numerous adjacent pixels indicate the same leaf area. Therefore, it is increasingly appropriate with increasing spatial resolution to combine adjacent partial areas having the same value for a growth parameter into a partial area.

In a further embodiment of the present invention, therefore, adjacent pixels having the same value for a growth parameter are combined into a partial area.

It is also conceivable to combine adjacent pixels into a partial area if they no longer deviate from one another as a predetermined absolute or relative value.

Further methods of segmentation are conceivable. Segmentation is ordinarily carried out in such a manner that partial areas with similar properties are created. Segmentation takes place using one or a plurality of parameters that represent one or a plurality of properties of the field and/or the crop plants cultivated in the field and/or the environmental conditions prevailing in the field (growth parameters). Segmentation is preferably carried out so as to minimize the differences within a partial area and maximize the differences between the partial areas. Segmentation can be carried out according to known mathematical methods such as e.g. the Jenks-Caspall algorithm.

For example, it is conceivable that segmentation is carried out directly using the growth stages of the cultivated crop plants observed in the current cultivation period. In such a case, by means of e.g. remote sensing data, differences in the cultivated crop plants with respect to the respective growth stages present are determined. In this case, segmentation of the field is carried out such that the crop plants in individual partial areas are in a comparable growth stage, with the differences in the growth stages within a partial area preferably being smaller than the differences in the growth stages between the partial areas.

However, it is also conceivable that segmentation is carried out based on inhomogeneities that have an effect on the growth behavior of the crop plants. For example, it is conceivable that by means of the remote sensors, differences in the soil properties are detected. For example, it is conceivable that different soil types are present in a field. It is known for the individual soil types that they lead to different growth of the crop plants. In such a case, segmentation is carried out based on the different soil properties/soil types.

It is also conceivable for remote sensing data from past cultivation periods to show historical differences in the growth behavior of the cultivated crop plants. Such historical differences can also be used for segmentation of the field if they are recurrent.

It is also conceivable to use a plurality of the aforementioned inhomogeneities for segmentation.

It is also conceivable to carry out segmentation based on the wheel gauge or the spray width of the agricultural machines ordinarily used in the field or to take into account the wheel gauge or the spray width in determining the size of the segments. If the partial areas are smaller than the wheel gauge or the spray width, the agricultural machine is not capable of addressing plant protection agents to individual partial areas in a targeted manner. In an embodiment of the present invention, the size of the partial areas is therefore selected such that it is not smaller than the spray width of the application device.

In a further step (step (C) of the method according to the invention), a plant protection model is prepared for the crop plants cultivated in the field. Step (C) can be carried out before, after or during steps (A) and (B).

The term "plant growth model" is understood to refer to a mathematical model that describes the growth of a plant depending on intrinsic (genetic) and extrinsic (environmental) factors.

Plant growth models exist for multiple crop plants. The term "provision of a plant growth model" is to be understood as meaning both that an existing model is used and that an existing model is adapted or modified, and also that a new model is drawn up.

An introduction to the preparation of plant growth models can be found for example in the books i) "Mathematische Modellbildung and Simulation [Mathematical Modelling and Simulation]" by Marco Gunther and Kai Velten, published by Wiley-VCH Verlag in October 2014 (ISBN: 978-3-527-41217-4), and ii) "Working with Dynamic Crop Models" by Daniel Wallach, David Makowski, James W. Jones and Francois Brun., published in 2014 by Academic Press (Elsevier), USA.

The plant growth model ordinarily simulates the growth of a population of crop plants over a defined period of time. It is also conceivable to use a model based on an individual plant that simulates the energy and material flows in the individual organs of the plant. Mixed models are also usable.

In addition to the genetic features of the plant, the growth of a crop plant is primarily determined by the local weather prevailing during the lifetime of the plant (quantity and spectral distribution of incident solar radiation, temperature gradient, amounts of precipitation, wind), the state of the soil, and the nutrient supply.

The cultivation measures carried out in the past and any infestation with harmful organisms can also affect plant growth and can be taken into account in the growth model.

The plant growth models are as a rule so-called dynamic process-based models (cf. "Working with Dynamic Crop Models" by Daniel Wallach, David Makowski, James W. Jones and Francois Brun., published 2014 by Academic Press (Elsevier), USA), but can also be entirely or partially rule-based or statistical or data-supported/empirical. The models are as a rule so-called point models. Here, the models are ordinarily calibrated such that the output reflects the spatial representation of the input. If the input is collected at a point in space or if interpolation or estimation is carried out for a point in space, it is generally assumed that the model output is valid for the entire adjacent field. An application of so-called point models calibrated at field level to further scales, which as a rule are cruder, is known (Hoffmann et al., 2016). Here, application of these so-called point models to multiple points within a field allows partial-area-specific modeling. However, spatial dependencies are neglected in this case, e.g. in the ground water balance. On the other hand, there are also systems for temporally/spatially explicit modeling. These take into account spatial dependencies.

Examples of dynamic, process-based plant growth models are Apsim, Lintul, Epic, Hermes, Monica, STICS, etc. For example, a comparison of the models and corresponding literature on the models can be found in the following publication and the references contained therein: Hoffmann H, Zhao G, Asseng S, Bindi M, Biernath C, Constantin J, Coucheney E, Dechow R, Doro L, Eckersten H, Gaiser T, Grosz B, Heinlein F, Kassie B T, Kersebaum K-C, Klein C, Kuhnert M, Lewan E, Moriondo M, Nendel C, Priesack E, Raynal H, Roggero P P, Röter R P, Siebert S, Specka X, Tao F, Teixeira E, Trombi G, Wallach D, Weihermüller L, Yeluripati J, Ewert F. 2016. Impact of spatial soil and climate input data aggregation on regional yield simulations. PLoS ONE 11(4): e0151782. doi:10.1371/journal.pone.0151782.

The following parameters are preferably included in the modeling (input):
a) weather: daily precipitation sums, solar radiation sums, daily minimum and maximum air temperature, temperature near the ground, soil temperature, wind speed, etc.
b) soil: soil type, soil texture, soil texture, kind of soil, field capacity, permanent wilting point, organic carbon, mineral nitrogen content, bulk density, van Genuchten parameters, etc.
c) crop plant: type, species, species-specific parameters such as e.g. specific leaf area index, temperature sums, maximum root depth, etc.
d) cultivation measures: seeds, sowing date, sowing density, sowing depth, fertilizer, fertilizer amount, number of fertilization dates, fertilization date, soil cultivation, crop residues, crop rotation, distance from field of same crop in the previous year, watering, etc.

In a following step (step (D) of the method according to the invention), the plant growth model is used to simulate for each partial area the growth of the crop plants cultivated in said area. In this case, the information from step (A) and/or (B) is included in the plant growth model.

For example, if it has been determined from remote sensing data that the crop plants cultivated in the field are in different growth stages, and if the field has been segmented into partial areas with similar growth stages, the current growth stage in each partial area is included in the growth model as a parameter, and the further (future) growth is predicted.

For example, if it has been determined from remote sensing data that in past cultivation periods, the crop plants in several partial areas repeatedly showed more rapid growth than in other partial areas, the field is segmented based on the observed growth rate, and the growth rate of each partial area is included in the plant growth model for predicting the growth in the current cultivation period.

For example, if it has been determined from remote sensing data that inhomogeneities are present under specified environmental conditions (e.g. soil properties, exposure to sunlight, wind or precipitation, temperature gradient, etc.) and if it is known that these inhomogeneities lead to different growth of the cultivated crop plants, segmentation of the field is carried out based on these environmental conditions, and the environmental conditions are included as parameters (growth parameters) in the modeling and prediction of the growth behavior of the crop plants.

The result of step (D) of the method according to the invention is the expected course over time of the growth of the crop plants for each partial area. The course over time can thus be used to predict the growth stage of the crop plants in each partial area for any given day within the current cultivation period. Step (D) is carried out after steps (A), (B) and (C).

In a further step (step (E) of the method according to the invention), a requirement for treatment with one or a plurality of plant protection agents is determined for at least a portion of the crop plants cultivated in the field. Step (E) can be carried out before, during or after steps (A), (B), (C) and (D). It is thus conceivable for determination of a requirement to be the trigger for one or more of steps (A), (B), (C) and (D). However, it is also conceivable for steps (A), (B), (C) and/or (D) to be carried out on a precautionary basis in order to "be armed" in the event of an acute requirement.

The requirement for treatment of crop plants with one or a plurality of plant protection agents can for example arise because a pest infestation has occurred or is imminent. Instead of a "requirement," one could therefore also speak of an "infestation or risk of infestation with a harmful organism."

The partial-area-specific requirement is preferably determined using sensors in and/or over the field.

The use of traps that are set up at various locations in the field can also make an infestation with harmful organisms detectable.

It is also conceivable to use for determination a requirement prediction model, e.g. for predicting pest infestations. Such prediction models have been extensively described in the prior art and are also commercially available. The decision support system proPlant Expert (Newe et al. 2003, Johnen et al. 2010; www.proPlantexpert.com) uses for prediction purposes data on the cultivated crop plant (development stage, growth conditions, plant protection measures), the weather (temperature, sunshine duration, wind speed, precipitation) and the known pests/diseases (economic limit values, pest/disease pressure). Using these data, an infestation risk is estimated and a recommendation on the time of treatment and plant protection agents and an evaluation of past plant protection measures are generated.

The infestation of an adjacent field by a harmful organism, which is reported for example by a farmer, can also indicate a requirement.

Once the requirement has been determined, the plant protection agent to be used follows from this. If the requirement is attributable to an acute or imminent infestation with weeds, then the plant protection agent to be used is a herbicide. The type of weeds determines the type of usable herbicide. If the requirement is attributable to an acute or imminent fungal infestation, then the plant protection agent to be used is a fungicide. The type of fungus determines the type of usable fungicide. If the requirement is attributable to an acute or imminent infestation with an animal pest, then the plant protection agent to be used is a pesticide. The type of animal pest determines the type of usable pesticides.

Once the requirement has been determined, the time window in which the one or plurality of plant protection agents is/are to be applied also follows from this requirement. If there is an acute requirement, application should be carried out immediately. If corresponding predictions indicate that a requirement is imminent in the near future, application can be carried out immediately, or optionally shortly before an acute infestation.

In a further step (step (F) of the method according to the invention), the information from steps (E) and (D) of the method according to the invention is merged: there is a requirement for treatment with one or a plurality of specific plant protection agents; the time window in which application is to carried out (application time window) is known; the growth stage in which the crop plants will be in the application time window is known. The amounts of the plant protection agents to be applied must now be calculated. This takes place in step (F) of the method according to the invention.

The amount of the plant protection agent required is determined by the respective growth stage. Different variables and their differences between two time points can be derived from the growth stage, such as e.g. the size of leaf areas, biomass, fruit amount, etc.

In a preferred embodiment, the amount of the plant protection agents required is calculated based on the leaf areas of the crop plants cultivated at the location in question, which are predicted in a partial-area-specific manner.

For example, if the plant protection agent is a pesticide for controlling an animal pest (e.g. caterpillars, beetles, etc.) that attacks the leaves, the larger the leaf area present, the greater the amount of plant protection agent required. Using the plant growth model, the sizes of the leaf areas can be predicted for the individual partial areas. It is also conceivable (depending on the model used) to predict size distributions of the leaf areas for the individual partial areas.

Based on the predicted sizes of the leaf areas, one can then calculate the required amounts of plant protection agents needed for example in order to provide optimum protection of the leaves from predators. Accordingly, there is preferably a positive linear correlation between the size of the leaf areas and the required amount of plant protection agents.

In another preferred embodiment, the required amount of plant protection agents is calculated not on the basis of predicted values for leaf areas but on the basis of predicted biomass. There is therefore preferably a positive linear correlation between biomass and the required amount of plant protection agents.

In another preferred embodiment, the required amount of plant protection agents is calculated based on the predicted fruit area or fruit mass.

In another preferred embodiment, the required amount of plant protection agents is calculated based on the number of shoots present.

Further connections between variables that can be derived from the predicted plant growth and the required amount of plant protection agents are conceivable. For example, it is conceivable that the plant protection agent is not applied until the crop plants reach a defined development stage (e.g. have flowers or fruits). It is conceivable that until this stage, no plant protection agent is applied, because a specified pest ordinarily does not occur until this stage, and from this stage on, a plant protection agent is applied, and the amount thereof then increases linearly with the biomass, fruit amount, or another plant parameter present. It is further conceivable that a first plant protection agent is used up to a specified growth stage and a different second plant protection agent is then used from this growth stage on.

In addition to the crop-plant-related parameters (leaf area, biomass, fruit mass, etc.), there are often further parameters that determine the optimum amount and/or concentration of a plant protection agent. In a preferred embodiment, such parameters are also taken into account in calculating the partial-area-specific required amounts.

For example, it is conceivable that the respective mechanism of action of a plant protection agent has an effect on the amount and/or concentration in which the plant protection agent should be applied in order to achieve an optimum effect. In a preferred embodiment, the mechanism of action of the plant protection agent is therefore included in calculating the required amounts.

It is also conceivable that environmental conditions at the time of application have an effect on the optimum amount of the plant protection agent to be used. Such environmental conditions can for example be the temperature, humidity, sunlight, etc. at the time of application.

For example, it is conceivable that a plant protection agent is very rapidly broken down by direct sunlight. Perhaps application of the plant protection agent is planned because of a high risk of infestation at a time when direct sunlight is to be expected. Accordingly, a larger amount is required than under overcast conditions in order to compensate for the portion broken down by direct sunlight. According to the described embodiment, the requirement for plant protection agents is adapted to correspond to the prevailing environmental conditions.

It is also conceivable that the system for application of the plant protection agent (application device) is subject to certain restrictions. For example, it is conceivable that the application device comprises a spraying device with which a constant flow of a plant protection agent can only be switched on and off, but with which the amount of the plant protection agent discharged cannot be varied. In this case, it would optionally be possible to set the requirement such that the discharge takes place in pulses, wherein the time between two pulses and the pulse length can be varied. In such a case, the result of calculation of the amount of plant protection agent required would be a pulse length and pulse frequency to be adjusted for the respective partial area.

Preferably, a digital application map is produced in a further step (step (G)). The digital application map is a digital representation of the field. The application map indicates the amounts of one or a plurality of selected plant protection agents to be applied and the partial areas of the field to which said agent(s) are to be applied, for example in order to prevent the spread of harmful organisms and/or to control harmful organisms.

In a further step, the plant protection agent is then applied in a partial-area-specific manner according to the application map.

In a preferred embodiment, the digital application map or parts thereof can be loaded into the working memory of an application device.

An application device is understood to refer to a mechanical device for applying a plant protection agent to a field. Such an application device comprises as a rule at least one container for accommodating at least one plant protection agent, a spraying device with which the plant protection agent is dispensed onto the field, and a control device with which feeding of the at least one plant protection agent from its container in the direction of the spraying device is controlled. Accordingly, the digital application map is preferably loaded into the working memory of the control unit. Moreover, the control unit is preferably connected to a position-determining system that detects the position of the application device on the field. Preferably, the control device initiates the application process when it is recorded on the digital application map that application is to take place at a location and when the position-determining system reports that the application device is at said location.

In another embodiment, a person (the user) loads the digital application map into a mobile computer system, e.g. a mobile telephone (smartphone) equipped with a GPS receiver. While the user moves over the field, the mobile computer system indicates to him/her by means of a graphic image of the field where he/she is located at any given time and at which locations he/she is to spray (apply) one or a plurality of pesticides. The user then carries out spraying at the sites where the application map has a corresponding indication.

Preferably, the present invention is combined with a prediction model for predicting pest infestations. Using the prediction model, a field-specific infestation risk is estimated, and a recommendation on the time of treatment and the plant protection agent, as well as an assessment of past plant protection measures, are generated.

The prediction model thus provides all of the important information on the use of a plant protection agent except for the respective amounts to be used in a partial-area-specific manner. In contrast, the present invention provides the respective amounts to be used in a partial-area-specific manner.

In the above-mentioned preferred embodiment, a prediction of an infestation risk is thus carried out. If the infestation risk exceeds a threshold value, a user determines according to the invention the partial-area-specific requirement for the amount of plant protection agents to be used and carries out a corresponding partial-area-specific application of the plant protection agent.

It is also conceivable for one or a plurality of steps of the method according to the invention to be carried out using a computer or by a computer.

A further subject matter of the present invention is therefore a computer program product. The computer program product comprises a data carrier on which a computer program is stored, which can be loaded into the working memory of a computer. The computer program causes the computer to carry out the steps described below.

A first step (step (i)) consists of reading a digital representation of a field in which crop plants are cultivated into the working memory of the computer.

For example, this digital representation can be a satellite image. However, it is also conceivable that a digital representation of a field is produced based on a satellite image in that e.g. the outer boundaries of a field are highlighted in the satellite image by means of graphic markings. It is conceivable to identify certain properties of the field by means of colored marking. It is conceivable, for example, for an NDVI to be determined for each pixel of the digital satellite image and for false color representation to be carried out, with the pixels being colored a darker green if the corresponding NDVI shows a high value and a lighter green if the corresponding NDVI shows a low value.

It is conceivable for the digital representation of the field to already be subdivided into partial areas when it is loaded into the working memory of the computer. For example, it is conceivable for each individual pixel of the digital image to represent a partial area. It is also conceivable for images already segmented into partial areas to be provided by a (commercial) vendor.

However, it is also conceivable for the partial areas themselves to first be produced using the computer. For this purpose, the digital representation of the field is analyzed and inhomogeneities in the field are detected, wherein the inhomogeneities provide information on different existing and/or future growth stages of the crop plants in the field. After this, segmentation of the digital representation of the field into partial areas is carried out based on the detected inhomogeneities as explained in detail above.

In a further step (step (ii)), the growth behavior of the crop plants cultivated in the field over time is calculated for each individual partial area by means of a plant growth model. Step (ii) can take place before, after or during step (i).

In a further step (step (iii)), a requirement for treatment of the crop plants with one or a plurality of plant protection agents is determined for at least a portion of the crop plants cultivated in the field. Step (iii) can be carried out before, after or during steps (i) and (ii).

In a further step (step iv), the information from steps (ii) and (iii) is merged. The respective partial-area-specific required amount is determined based on information on a requirement and based on the information on the respective growth stage of the crop plants within the partial areas produced. Accordingly, step (iv) is carried out after steps (ii) and (iii).

In a further step (step (v)), the calculated partial-area-specific required amount is output to a user in the form of a digital application map. Preferably, the user can transfer the digital application map to an application device by means of a mobile data storage medium or via a wireless communication link (e.g. Bluetooth).

A further subject matter of the present invention is a system comprising the following elements:
(a) a digital representation of a field in which crop plants are cultivated, wherein inhomogeneities are recorded in the digital representation, wherein the inhomogeneities provide information on different existing and/or future growth stages of the crop plants in the field,
(b) means for segmenting the digital representation into partial areas based on the inhomogeneities,
(c) a plant growth model for the crop plants cultivated in the field,
(d) means for using the plant model on each partial area,
(e) means for receiving a requirement of at least a portion of the cultivated crop plants for treatment with one or a plurality of plant protection agents,
(f) means for calculating the required amount of one or a plurality of plant protection agents for each partial area based on the simulations of the growth behavior, and
(g) means for producing a partial-area-specific application map, wherein the application map is a digital representation of the field that indicates for individual partial areas of the field the respective amount(s) of (the) plant protection agent(s) to be applied.

Means (b), (d), (e), (f) and (g) are preferably a stationary or mobile computer system. It is conceivable for a plurality of computer systems networked to one another to be used; however, it is also conceivable for only a single computer system to be used that carries out the functions mentioned under (b), (d), (e), (f) and (g).

Figure 1:
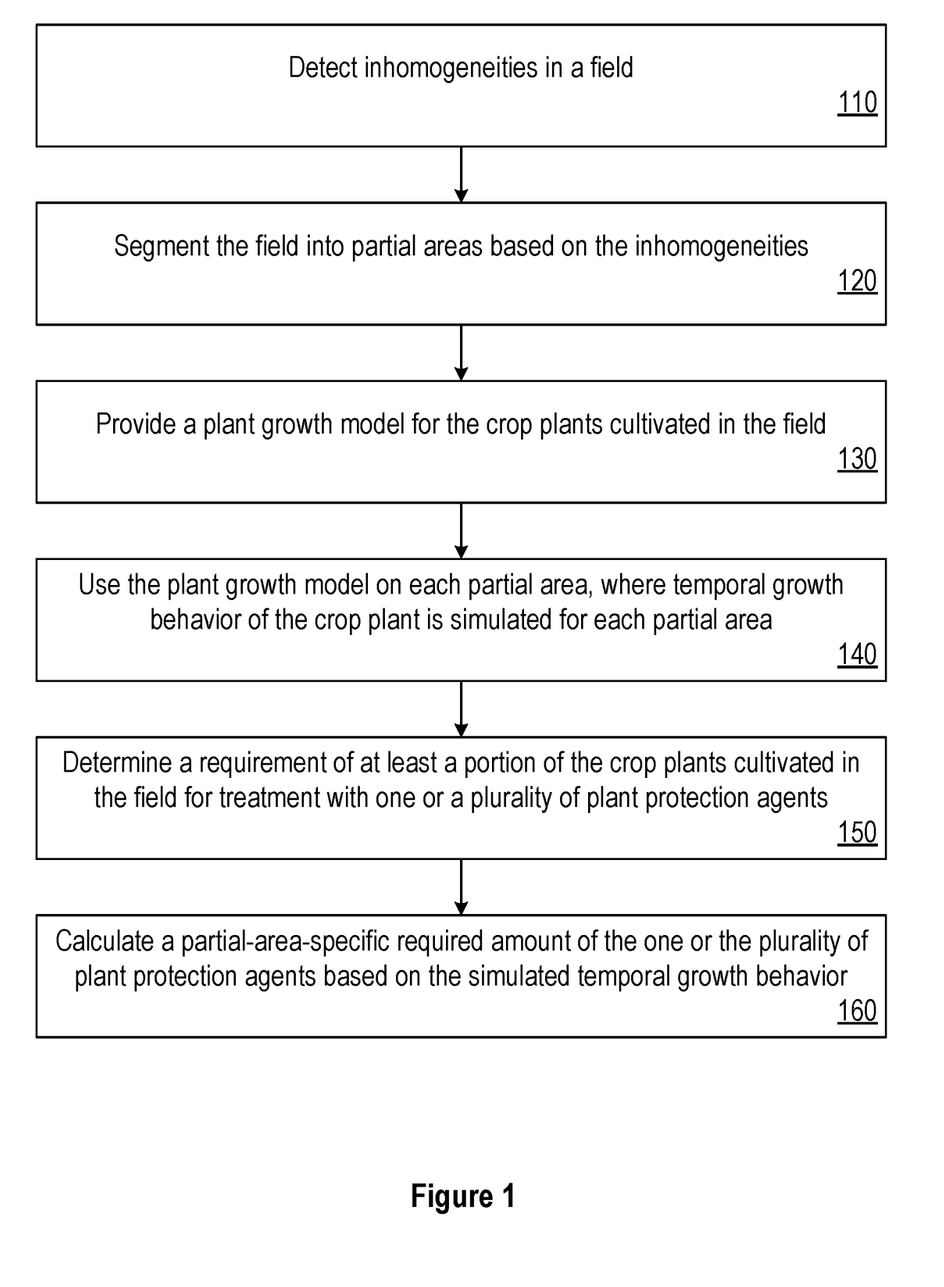
FIG. 1 is a flow chart illustrating a method for determining an amount required by crop plants in a field of one or a plurality of plant protection agents in accordance with an embodiment of the present invention.

FIG. 1 is a flow chart illustrating a method for determining an amount required by crop plants in a field of one or a plurality of plant protection agents in accordance with an embodiment of the present invention. At block 110, inhomogeneities are detected in a field. The inhomogeneities may indicate different existing and/or future growth stages of the crop plants in the field. At block 120, the field is segmented into partial areas based on the inhomogeneities detected in block 110. At block 130, a plant growth model is provided for the crop plants cultivated in the field. At block 140, the plant growth model is used on each partial area. Temporal growth behavior of the crop plant is simulated for each partial area. At block 150, a determination is made of a requirement of at least a portion of the crop plants cultivated in the field with one or a plurality of plant protection agents. At block 160, a partial-area-specific required amount of one or a plurality of plant protection agents based on the simulated temporal growth behavior of block 140 and the requirement determined in step 150 is calculated.

Figure 2:
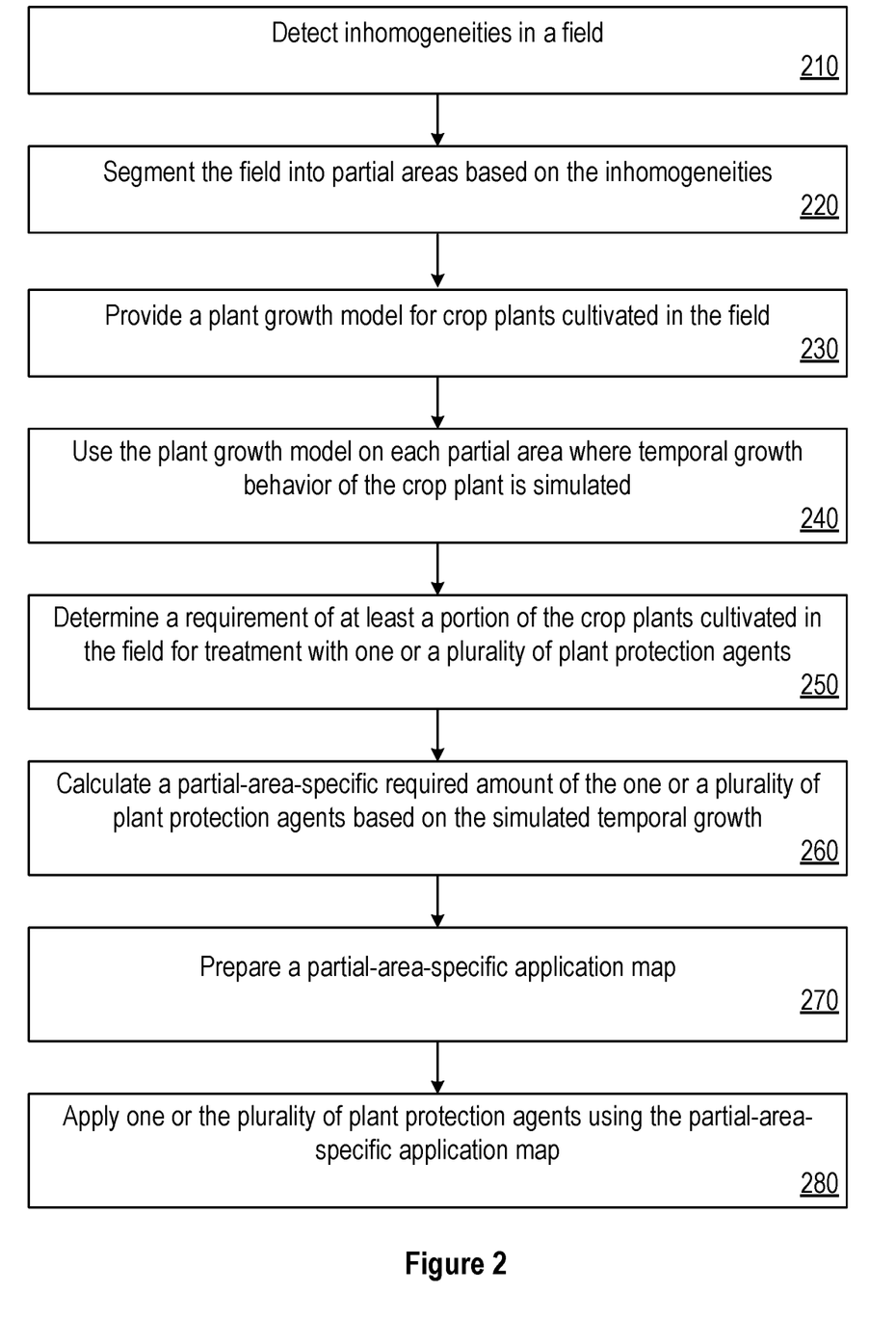
FIG. 2 is a flow chart illustrating a method for treating crop plants in a field with one or a plurality of plant protection agents in accordance with an embodiment of the present invention.

FIG. 2 is a flow chart illustrating a method for treating crop plants in a field with one or a plurality of plant protection agents in accordance with an embodiment of the present invention. At block 210, inhomogeneities are detected in a field. The inhomogeneities may indicate different existing and/or future growth stages of the crop plants in the field. At block 220, the field is segmented into partial areas based on the inhomogeneities detected in block 210. At block 230, a plant growth model is provided for the crop plants cultivated in the field. At block 240, the plant growth model is used on each partial area. Temporal growth behavior of the crop plant is simulated for each partial area. At block 250, a determination is made of a requirement of at least a portion of the crop plants cultivated in the field for treatment with one or a plurality of plant protection agents. At block 260, a partial-area-specific required amount of one or a plurality of plant protection agents based on the simulated temporal growth behavior of block 240 and based on the requirement determined in block 250. At block 270, a partial-area-specific application map is prepared. The application map may be a digital representation of the field that indicates for individual partial areas of the field the respective amount(s) of (the) plant protection agent(s) to be applied. At block 280, one or a plurality of plant protection agents using the partial-area-specific application map is applied.

The invention claimed is:

1. A method for determining an amount required by crop plants in a field of one or a plurality of plant protection agents, comprising the following steps:
   (A) detecting inhomogeneities in the field, wherein the inhomogeneities indicate different existing and/or future growth stages of the crop plants in the field,
   (B) segmenting the field into partial areas based on the inhomogeneities detected in step (A),
   (C) providing a plant growth model for the crop plants cultivated in the field,
   (D) using the plant growth model on each partial area, wherein temporal growth behavior of the crop plant is simulated for each partial area,
   (E) determining a requirement of at least a portion of the crop plants cultivated in the field for treatment with one or a plurality of plant protection agents, and
   (F) calculating a partial-area-specific required amount of one or a plurality of plant protection agents based on the simulated temporal growth behavior in step (D) and the requirement determined in step (E).

2. A method for treating crop plants in a field with one or a plurality of plant protection agents, comprising the following steps:
   (A) detecting inhomogeneities in the field, wherein the inhomogeneities indicate different existing and/or future growth stages of the crop plants in the field,
   (B) segmenting the field into partial areas based on the inhomogeneities detected in step (A),
   (C) providing a plant growth model for the crop plants cultivated in the field,
   (D) using the plant growth model on each partial area, wherein temporal growth behavior of the crop plant is simulated for each partial area,
   (E) determining a requirement of at least a portion of the crop plants cultivated in the field for treatment with one or a plurality of plant protection agents,
   (F) calculating a partial-area-specific required amount of one or a plurality of plant protection agents based on the simulated temporal growth behavior of step (D) and based on the requirement determined in step (E),
   (G) preparing a partial-area-specific application map, wherein the application map is a digital representation of the field that indicates for individual partial areas of the field the respective amount(s) of (the) plant protection agent(s) to be applied, and
   (H) applying one or a plurality of plant protection agents using the partial-area-specific application map.

3. The method as claimed in claim 1, wherein in step (A), remote sensing data on the field are analyzed, NDVI or LAI values for individual partial areas of the field are calculated, and the NDVI or LAI values are referred to for calculating the partial-area-specific required amount of one or a plurality of plant protection agents in step (F).

4. The method as claimed in claim 1, wherein a digital image of the field produced by means of remote sensors is used in step (A) and a partial area is assigned to each pixel of the digital image.

5. The method as claimed in claim 1, wherein a digital image of the field produced by means of remote sensors is used in step (A) and adjacent pixels of the digital image that indicate the same value with respect to a growth parameter or no longer deviate from one another as a preset value are combined into a partial area.

6. The method as claimed in claim 1, characterized in that a prediction model is used for determining the requirement in step (E).

7. The method as claimed in claim 1, characterized in that the size of the partial areas is adapted to a spray width of an application machine.

8. The method as claimed in claim 1, characterized in that the plant protection agent is a herbicide, fungicide, or pesticide.

9. A system comprising
   (a) a digital representation of a field in which crop plants are cultivated, wherein inhomogeneities are recorded in the digital representation, wherein the inhomogeneities provide information on different existing and/or future growth stages of the crop plants in the field,
   (b) means for segmenting the digital representation into partial areas based on the inhomogeneities,
   (c) a plant growth model for the crop plants cultivated in the field,
   (d) means for using the plant model on each partial area,
   (e) means for receiving a requirement of at least a portion of the cultivated crop plants for treatment with one or a plurality of plant protection agents,
   (f) means for calculating the required amount of one or a plurality of plant protection agents for each partial area based on simulations of growth behavior of the crop plants, and
   (g) means for producing a partial-area-specific application map, wherein the application map is a digital representation of the field that indicates for individual partial areas of the field the respective amount(s) of (the) plant protection agent(s) to be applied.

10. The system as claimed in claim 9, wherein the digital representation of the field is based on a satellite image and the inhomogeneities are different vegetation indices or leaf area indices.

11. A non-transitory storage medium on which a computer program is stored, which can be loaded into a working memory of a computer and causes the computer to carry out the following steps:

(i) reading a digital representation of a field in which crop plants are cultivated into the working memory of the computer, wherein the field in the digital representation is subdivided into partial areas, wherein at least a portion of the partial areas differ with respect to existing and/or future growth behavior of the cultivated crop plants, (ii) calculating the growth behavior of the crop plants cultivated in the field over time for each individual partial area by means of a plant growth model, (iii) receiving a requirement of at least a portion of the cultivated crop plants for treatment with one or a plurality of plant protection agents, (iv) calculating the required amount of the one or plurality of plant protection agent(s) for each partial area based on a calculated growth stage for the respective partial area of the crop plants cultivated there, and (v) outputting the plant protection agent requirement for each partial area to a user.

* * * * *